US010381929B2

(12) United States Patent
Ferencz et al.

(10) Patent No.: US 10,381,929 B2
(45) Date of Patent: Aug. 13, 2019

(54) VOLTAGE CONTROL UTILIZING MULTIPLE PWM PATTERNS

(71) Applicant: International Business Machines Corporation, Armonk, NY (US)

(72) Inventors: Andrew Ferencz, Southborough, MA (US); Todd E. Takken, Brewster, NY (US); Paul W. Coteus, Yorktown, NY (US); Xin Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/111,350

(22) Filed: Aug. 24, 2018

(65) Prior Publication Data

US 2019/0165677 A1    May 30, 2019

Related U.S. Application Data

(63) Continuation of application No. 15/826,793, filed on Nov. 30, 2017, now Pat. No. 10,097,090.

(51) Int. Cl.
*H02M 3/158*    (2006.01)
*H02M 1/08*    (2006.01)
(Continued)

(52) U.S. Cl.
CPC .............. *H02M 3/158* (2013.01); *H02M 1/08* (2013.01); *H02M 1/36* (2013.01); *H02P 9/30* (2013.01); *H02M 2001/0003* (2013.01)

(58) Field of Classification Search
CPC .... H02M 3/156; H02M 3/158; H02M 3/1563; H02M 3/157; H02M 3/1582; H02M 3/155; H02M 3/1584; H02M 2003/1586
(Continued)

(56) References Cited

U.S. PATENT DOCUMENTS 7,391,630 B2    6/2008 Acatrinei
7,456,618 B2    11/2008 Jain et al.
(Continued)

FOREIGN PATENT DOCUMENTS

WO          9739523 A1    10/1997

OTHER PUBLICATIONS

Biswal, M., "Control Techniques for DC-DC Buck Converter With Improved Performance", A Thesis Submitted in Partial Fulfillment of the Requirments for the Degree of Master of Technology (Research) in Electrical Engineering, Mar. 2011, 108 pages.
(Continued)

*Primary Examiner* — Nguyen Tran
(74) *Attorney, Agent, or Firm* — Peter J. Edwards

(57) ABSTRACT

A power-delivery system may comprise a load device and a direct-current converter configured to deliver current to the load device when the direct-current converter is in an on state. The power-deliver system may comprise a voltage-measurement system configured to measure, at a beginning of each measurement cycle in a cyclic measurement pattern, a voltage at the load device. The power-deliver system may comprise a power controller configure to receive, at the beginning of each measurement cycle, the measurement of the voltage, and to perform, at the beginning of a control cycle in a cyclic control pattern, a voltage-control decision in response to a change in the measurement of the voltage being below a voltage-change threshold. The voltage-control decision may comprise whether to switch the state of the first direct-current converter. The cyclic control pattern may operate at a first frequency, and the measurement pattern may operate at a second frequency.

9 Claims, 7 Drawing Sheets

(51) Int. Cl.
*H02P 9/30* (2006.01)
*H02M 1/36* (2007.01)
*H02M 1/00* (2006.01)

(58) Field of Classification Search
USPC .............................. 323/222, 271, 282–285
See application file for complete search history.

(56) References Cited

U.S. PATENT DOCUMENTS

| | | | |
|---|---|---|---|
| 7,737,643 B2 | 6/2010 | Lys | |
| 7,902,800 B2 | 3/2011 | Jain et al. | |
| 8,493,049 B2 | 7/2013 | Kwan et al. | |
| 8,575,910 B2 | 11/2013 | Young | |
| 8,619,849 B2 | 12/2013 | Effler et al. | |
| 8,638,571 B2 | 1/2014 | Tschirhart et al. | |
| 8,810,294 B2 | 8/2014 | Lynch et al. | |
| 9,240,721 B2 | 1/2016 | Babazadeh et al. | |
| 9,473,087 B2 | 10/2016 | Lesso et al. | |
| 9,490,719 B2 | 11/2016 | Scandola | |
| 2005/0270814 A1 | 12/2005 | Oh | |
| 2006/0064609 A1* | 3/2006 | Bryan | H03K 7/08 714/700 |
| 2007/0013350 A1 | 1/2007 | Tang et al. | |
| 2007/0109825 A1* | 5/2007 | Qiu | H02M 3/156 363/41 |
| 2007/0262802 A1* | 11/2007 | Huard | H02M 3/157 327/172 |
| 2009/0184742 A1 | 7/2009 | Kris | |
| 2010/0301826 A1 | 12/2010 | Moussaoui et al. | |

OTHER PUBLICATIONS

Babazadeh et al., "Near Time-Optimal Transient Response in DC-DC Buck Converters Taking into Account the Inductor Current Limit", IEEE Energy Conversion Congress and Exposition, Sep. 20-24, 2009, pp. 3328-3335.

Meyer, E., "New Technologies to Improve the Transient Response of Buck Converters", A thesis submitted to the Department of Electrical and Computer Engineering In conformity with the requirements for the degree of Doctor of Philosophy, Jan. 2010, 283 pages.

Ferencz et al., "Voltage Control Utilizing Multiple PWM Patterns," U.S. Appl. No. 15/826,793, filed Nov. 30, 2017.

List of IBM Patents or Patent Applications Treated as Related, Dated Aug. 20, 2018, 2 pages.

* cited by examiner

VOLTAGE CONTROL UTILIZING MULTIPLE PWM PATTERNS

STATEMENT REGARDING FEDERALLY SPONSORED RESEARCH OR DEVELOPMENT

This invention was made with Government support under contract number B604142, awarded by the Department of Energy. The Government has certain rights to this invention.

BACKGROUND

The present disclosure relates to electronic power supply, and more specifically, to voltage regulation management.

Typical solutions for voltage regulation management in electronic power supply involve issuing commands to power converters according to a cyclic pulse-width-modulation (PWM) pattern. Solutions utilizing PWM patterns with large cycle periods are limited in their ability to respond quickly to potentially damaging changes in voltage. Solutions utilizing PWM patterns with small cycle periods are often inefficient.

SUMMARY

Some embodiments of the present disclosure can be illustrated as a power-delivery system. The power-delivery system may comprise a load device and a direct-current converter configured to deliver current to the load device when the direct-current converter is in an on state. The power-delivery system may further comprise a voltage measurement system that is configured to measure a voltage at the load device at the beginning of each measurement cycle in a cyclic measurement pattern. The power-delivery system may further comprise a power controller. The power controller may be configured to receive the measurement of the voltage at the beginning of each measurement cycle in the cyclic measurement pattern. The power controller may further be configured to perform, at the beginning of a control cycle in a cyclic control pattern, a voltage-control decision in response to first change in the measurement of the voltage being below a voltage-change threshold. This voltage-control decision may comprise a decision of whether to switch the state of direct-current converter. The first cyclic control pattern may operate at a first frequency. The second cyclic control pattern and the cyclic measurement pattern operate at a second frequency. The second frequency may be a positive integer multiple of the first frequency. The positive-integer multiple may be greater than 1. The beginning of the first control cycle may coincide with the beginning of a measurement cycle.

Some embodiments of the present disclosure may be illustrated as a method of controlling a voltage at a load device. The method may comprise measuring a first voltage at the load device at the beginning of a first cycle in a cyclic measurement pattern. The method may also comprise detecting, based on the first voltage, a first change in the voltage, and determining that the first change in the voltage is below a voltage-change threshold. The method may further comprise controlling the voltage according to a first cyclic control pattern based on that determination. The method may also comprise measuring a second voltage at the load device at the beginning of a second cycle in the cyclic measurement pattern. The method may also comprise detecting, based on the second voltage, a second change in the voltage, and determining that the second change in the voltage is above a voltage-change threshold. The method may further comprise controlling the voltage according to a second cyclic control pattern based on that determination. The first cyclic control pattern may operate at a first frequency. The cyclic measurement pattern and the second cyclic control pattern may operate at a second frequency. The second frequency may be a positive-integer multiple of the first frequency. The positive-integer multiple may be greater than 1.

Some embodiments of the present disclosure may be illustrated as a voltage controller. The voltage controller may be configured to measure, at the beginning of a first measurement cycle in a cyclic measurement pattern, a first voltage at a load device. The voltage controller may also be configured to measure, at the beginning of a second measurement cycle in the cyclic measurement pattern, a second voltage at the load device. The voltage controller may be configured to detect a rate of change in voltage based on the first and second voltages, and to determine that the rate of change is below a voltage-change threshold. The voltage controller may further be configured to control, based on that determining, the voltage according to a steady-state cyclic control pattern. The cyclic measurement pattern may operate at a first frequency. the steady-state cyclic control pattern may operate at a second frequency. The first frequency may be a positive-integer multiple of the second frequency. The first positive-integer multiple may be greater than 1.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
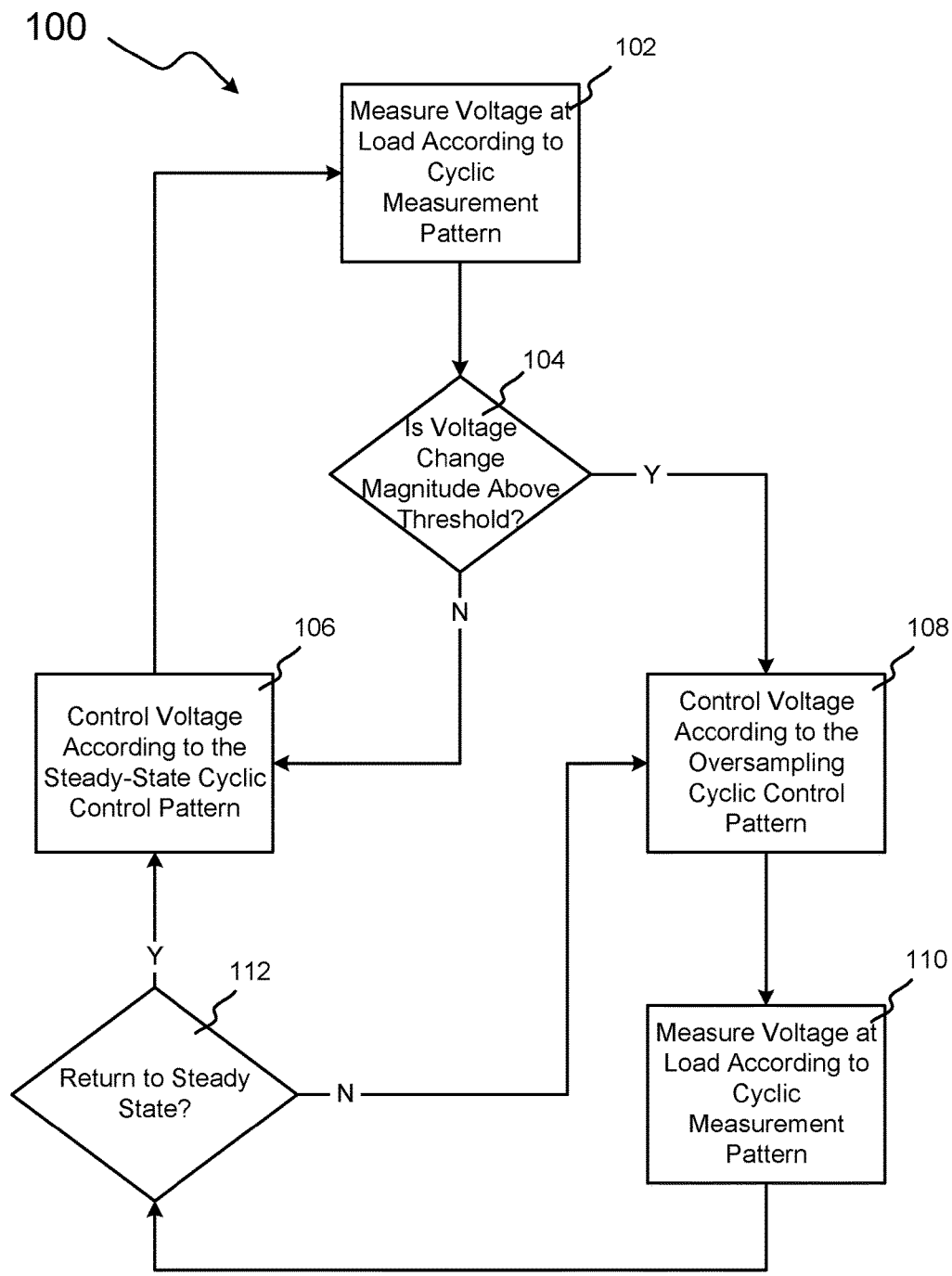
FIG. 1 illustrates a flowchart of an example method of controlling the voltage at a device with a single cyclic measurement pattern and multiple cyclic PWM patterns, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic power supply, more particular aspects relate to voltage regulation management. While the present disclosure is not necessarily limited to such applications, various aspects of the disclosure may be appreciated through a discussion of various examples using this context.

Some high-performance electronic devices (hereinafter, "devices"), such as computer processors and application-specific integrated circuits (hereinafter, "ASICs"), have strict requirements for the voltage of power provided to the device. For example, a computer processor or ASIC may accept voltage between 0.6 volts (V) and 1.0 V. If current above 1.0 V or below 0.6 V is delivered to the processor or ASIC, it may temporarily malfunction, shut off, or be functionally destroyed. Thus, the voltage of the power provided to these high-performance electronic devices must be precisely controlled.

However, the current provided to a device can change rapidly depending factors that may be external or internal to the device. For example, a power surge on the electrical system feeding the device (e.g., the electrical utility grid, a back-up home electricity generator) may force additional current to the device, which increases the voltage of the power delivered. Similarly, a large, sudden draw of current on the same electric circuit that feeds the device (e.g., when turning on a large air-condition condenser) may temporarily cause the voltage throughout the circuit to drop. The amount of electricity demanded by a device can also change suddenly. For example, if a computer processor transitions from idle to intense activity, the current demanded by the processor will increase rapidly. Due to the finite output impedance of the processor's power supply, this increase in current may also cause a temporary dip in voltage of the current delivered to the processor. The magnitude of the voltage dip would be determined by the impedance of the power supply.

One method of controlling the voltage at a device may be to directly regulate the voltage with rectified transformer voltage regulation. However, rectified transformer voltage regulation includes inefficiencies that translate to loss of power. A more efficient method of regulating voltage is referred to as pulse-width management (PWM) voltage regulation. In PWM voltage regulation, voltage is not directly controlled. Rather, electricity is delivered to a device in pulses at constant voltage over a period of time. The average voltage over time of the electricity output by the power source is the voltage perceived by the device. For example, if a fan is fed a 1-second burst of 12 V electricity every other second (i.e., 12 volts in the first second, 0 V in the second, 12 volts in the third second, and so on) the device may perceive receiving a constant 6 V of electricity over the total time.

However, powering sensitive devices with PWM electricity requires smoothing out the electricity provided to the device to avoid the device malfunctioning due to constant changes in current and voltage. One method of smoothing out power involves passing PWM electricity through one or both of an inductor and a capacitor before delivering the electricity to the device. This may help to transform distinct pulses of electricity to a smoother flow of electricity.

In some applications, the pulses of electricity delivered to sensitive devices in PWM are managed by a controller. The controller determines how much voltage present at the device at any given time and issues a command to a converter (e.g., a DC/DC converter, such as a buck-boost converter) to deliver electricity to a device in pulses of a width that corresponds to the voltage need. In some applications, the converter may deliver that electricity through an inductor and capacitor in order to make the electricity delivery appear smoother to the device.

In applications with particularly sensitive devices, relying on inductors and capacitors to smooth the delivered power alone may not be practical due, in part, to inefficiencies resulting from increasing the capacitance of a circuit. Thus, shorter, more frequent pulses rather than longer, more occasional pulses are delivered to these devices in order to make the power delivery appear smoother and more continuous. However, some converters used in power delivery systems are unable to continuously efficiently deliver pulses of sufficiently high frequency for these applications.

For this reason, in some applications multiple converters are used to deliver power. In such applications, only one converter may be configured to deliver power at any given time, while the other converters sit idle. This may allow the idle converters more time to cool down between pulsing activity, causing the converters to maintain a temperature closer to the temperature at which the converters operate most efficiently. Further, if the pulses of converters are allowed to overlap, the overall current supplied by the system is greater during the overlap. This allows delivery of higher current when needed. However, if the frequency of converter pulses is sufficiently high and sufficiently smoothed by, for example, an inductor and a capacitor, a device accepting power from the system may perceive the power delivery as one continuous pulsing pattern, as if from 1 converter. For example, a voltage regulation module may contain 10 converters that all deliver power out of phase from each other. In this example, if each controller pulsing for only 5% of each cycle, current will be delivered to the load device for 50% of the each cycle, even though each converter may be resting for 95% of the total power cycle.

A power controller manages the cyclic pattern in which the converters pulse current. This cyclic pattern is sometimes referred to as the PWM cyclic pattern, or cyclic PWM pattern. One repetition of the pattern (e.g., one converter pulsing, resting, and beginning to pulse again) is referred to as one PWM cycle. The length of time that passes during a PWM cycle is referred to as the PWM period. The length of time during the PWM cycle that a converter is actually providing power (also referred to as pulsing) is referred to as a duty cycle.

The cyclic PWM pattern of a power controller typically dictates the timing according to which the controller measures voltage and issues commands to control that voltage; at the beginning of each PWM cycle, a power controller measures the voltage at the load device and controls the power delivery by the converter that is active during that PWM cycle based on that measurement. The PWM period is typically determined by the operating efficiencies of the converter(s) used in the power-delivery system (i.e., the PWM period is set close to or equal to the value that results in the most efficient converter performance).

However, because a power controller only reacts to the measurement at the device once per PWM cycle, a longer PWM cycle (e.g., for the sake of converter efficiency) results in a potential for more time between a voltage change at a device and the ability of a power controller to react. This is not ideal, because large, sudden changes in voltage (i.e., the voltage changes that can be dangerous to sensitive devices) often require faster reaction than smaller, gradual changes in voltage. For the purposes of fast reaction time to voltage changes, the shortest possible PWM cycle is ideal.

While adding more converters (and thus, phases) into a power-deliver system may make shorter PWM cycles more feasible, in typical applications it is not cost effective to add in a sufficient amount of phases for ideal reaction to changes in voltage. Even assuming that cost were not an issue, it may also be impractical to add a significant amount of converters, as each converter typically is paired with an inductor and capacitor to smooth out power delivered to a device, and space considerations may limit the amount of converters that may be added to the system.

However, even if cost and space considerations were not relevant, inefficiencies would still result from a power system in which many converters were delivering short pulses in short PWM cycles. When a converter switches on and off, there is a ramping time during which the converter is not functioning efficiently. As the length of time during which the converter is switched on (i.e., the pulse length) decreases, the percentage of the pulse length during which the converter is ramping up or down (and thus functioning less efficiently) increases.

Therefore, in situations during which a large voltage change is occurring, a short PWM cycle is ideal. However, in most situations (e.g., steady state operation, such as normal device performance or idling), a longer PWM cycle is more efficient, and is thus ideal.

In some embodiments of the present disclosure, multiple cyclic patterns of different lengths are maintained by the power system. For example, a cyclic measurement pattern may have a short measurement period. A first cyclic control pattern may have a short PWM period that is the same as that of the measurement period. If the short PWM period is the same as the measurement period and the two periods are in phase, the two cyclic measurement patterns may be referred to collectively as a cyclic PWM pattern. Further, the cycles of that cyclic PWM pattern may be referred to as PWM cycles, and the periods of those cycles may be referred to as PWM periods.

A second cyclic control pattern may have a period that is far slower than the short measurement and PWM periods. At the beginning of each cyclic measurement pattern, the control system receives a measurement of the voltage at the load device. If the measurement suggests that a large change in voltage is not occurring (i.e., the device is in steady state operation), the controller may activate a converter at the beginning of the next cycle of the second cyclic control pattern. However, if the measurement suggests that a large change in voltage is occurring, the controller may activate a converter at the beginning of the next cycle of the first (faster) cyclic control pattern. This may enable the system to respond faster to the large change in voltage, which may prevent errors in or damage to the load device. Further, because responding faster to large changes in voltage may help to mitigate those large changes in voltage, instantaneous departures from the ideal voltage may be reduced in magnitude. For that reason, the average voltage over time may be closer to the ideal voltage even before the voltage is smoothed by inductors and capacitors. This may lead to further economic benefits, such as enabling power-system designers to use fewer inductors and capacitors without risking dangerous voltage levels. This may both decrease the cost of components of a system, but also decrease the physical space of the system that is taken up by electricity-smoothing components.

FIG. 1 illustrates a flowchart of an example method 100 of controlling the voltage at the device with a single cyclic measurement pattern and multiple cyclic PWM patterns (in this example, referred to as a steady-state cyclic control pattern and an oversampling cyclic control pattern). In method 100, a voltage controller measures the voltage at the electronic device (e.g., a computer processor) at block 102. This measurement may occur at the beginning of a measurement cycle in a cyclic measurement pattern. The measurement cycles in the cyclic measurement pattern may have a measurement period. The inverse of this measurement period may be referred to as the measurement frequency, and may be an expression of how often the voltage is measured in the cyclic measurement pattern.

Further, this measurement may occur in several ways. For example, in some embodiments a physical voltage-measurement system may be placed between the last component in the power delivery system (e.g., a converter, inductor, or capacitor) and the processor. The power from the last component may flow through the system, at which point it is measured. This measurement may then be communicated to the voltage controller. Alternatively, a voltage controller may be connected to several leads that connect to the delivery medium of the power to the processor. For example, the leads may connect to a copper wire embedded within a circuit board. These leads may measure the voltage. Further, because the leads may be directly connected to the voltage controller, the voltage controller may automatically receive the voltage measurement. As another alternative, in some embodiments the electronic device may have the capability to measure and report the voltage of the power it is receiving. In those embodiments, the electronic device may also be configured to deliver the voltage measurement to the voltage controller.

Regardless of how the voltage controller receives the voltage measurement in 102, the voltage controller determines in block 104 if the measurement represents a magnitude of a voltage change (i.e., a scalar voltage change) that is above a voltage-change threshold. In some embodiments, for example, the voltage controller may compare the two most-recent voltage measurements by subtracting one from the other. If the absolute value of the resulting number (e.g., a change of either 0.20 V or −0.20 V would be analyzed as |0.20| V) is below the voltage-change threshold (e.g., |0.25| V), it may imply that the device is in steady-state operation. Thus, if the voltage controller determines that there is no voltage change above the voltage-change threshold, the voltage controller controls the voltage according to a steady-state cyclic control pattern in block 106.

In some embodiments, a load device may be more sensitive to voltage increases than decreases, or voltage decreases than increases. In these embodiments, it may be beneficial to establish different voltage-change thresholds for voltage increases and for voltage decreases. For example, a voltage controller may set a voltage-change threshold of 0.5 V for voltage increases, but 0.4 V for voltage decreases. In this example, a voltage increase of 0.45

V would not trigger the voltage-change threshold, but a voltage decrease of 0.45 V would trigger the voltage change threshold.

The steady-state cyclic control pattern, in this example, is a cyclic PWM pattern that dictates the frequency with which the voltage controller issues control commands during the processor's steady-state operations. This frequency (referred to herein generally as a PWM frequency, and specifically, in this example, as a steady-state control frequency) may be the inverse of the period of the cycles in the steady-state cyclic control pattern (referred to in this example as a steady-state control period). The steady-state control period, in this embodiment, is longer than the measurement period (i.e., the steady-state control frequency is slower than the measurement frequency). For example, in some embodiments, the steady-state control period may be a positive integer multiple of the measurement period (i.e., measurement frequency may be a positive integer multiple of the steady-state control frequency). For example, if the measurement period were 2 microseconds (μS), the steady-state control period may be, for example, 4 μS, 6 μS, or 10 μS, but not 3 μS or 7 μS.

In this embodiment, "controlling the voltage" may refer to commanding a converter (e.g., a DC/DC converter) to pulse current during a portion of a cycle in a cyclic PWM pattern. For example, the voltage controller may command a converter to supply electricity (i.e., to "pulse") during the first 25% of the current cycle of the steady-state cyclic control cycle. The voltage controller may also command the converter to sit idle during the current cycle (i.e., to supply electricity for 0% of the current cycle). Upon controlling the voltage in block 106, the voltage controller measures the voltage at the processor at the next measurement cycle in block 102.

If, on the other hand, the voltage controller does determine, at block 104, that a voltage change is above the voltage-change threshold, it may imply that the device is experiencing a potentially dangerous high-transient voltage change (e.g., a large spike or large drop in voltage). Thus, the voltage controller would then control the voltage according to an oversampling cyclic control pattern at block 108. The oversampling cyclic control pattern may be similar to the steady-state cyclic control pattern in that it is also a cyclic PWM pattern. However, in this embodiment, the oversampling cyclic control pattern is a faster control pattern (i.e., it has a higher frequency), and is used to dictate the frequency with which the voltage controller issues control commands in a high-transient voltage situation (referred to in this example as an oversampling control frequency), rather than in steady-state operation.

For example, a voltage controller may take the form of a proportional-integral-derivative controller (hereinafter, a "PID controller") which applies voltage control according to a mathematical function. The mathematical function may be expressed, for example, as a sum of a proportional term, an integral term, and a derivative term. The proportional term may represent a present voltage value or the difference between the present voltage value and the desired voltage value. The integral term may represent one or more past voltage values or the differences between those past voltage values and the voltage values desired at those respective times. The derivative term may represent one or more estimated future voltage values (based on current voltage-control-command trends) or the differences between those estimated future voltage values and the desired voltage values at those respective times. In these embodiments, the steady-state cyclic control pattern may correspond to the sum of the proportional and integral terms, while the oversampling cyclic control pattern may correspond to the derivative term.

Similar to the steady-state control frequency, the inverse of the oversampling control frequency is the length of the period of the cycles in the oversampling cyclic control pattern (referred to in this example as an oversampling control period). The oversampling control period, in this embodiment, is shorter than the steady-state period (i.e., the oversampling control frequency is faster than the steady-state frequency). For example, in some embodiments, the steady-state control period may be a positive-integer multiple of the oversampling period.

In similar embodiments, the oversampling control period may be the same as the measurement period. Further, the measurement cycles and the oversampling control cycles may be in phase, such that they begin and end at the same times. The steady-state control cycles may also be timed such that the start and end time of each steady-state control cycle begins and ends at the same time as the beginning and ending of a oversampling control cycle, a measurement cycle, or both. In other words, the steady state control cycle could be considered to be in phase with a hypothetical multiple of the oversampling control cycle, the measurement cycle, or both. For example, if the steady-state control period were 4 times as long as the oversampling control period, the steady-state control cycle could be considered to be in phase with four coinciding oversampling control cycles.

Controlling the voltage according to the oversampling cyclic control pattern in block 108 may enable the voltage controller to react sooner to a high-transient-voltage situation. For example, if the oversampling control frequency is 10 times as fast as the steady-state control frequency, the voltage controller may be able to issue a control command to address the potentially dangerous voltage change up to 10 times as soon as it would be able to if controlling according to the steady-state cyclic control pattern.

After issuing a control command in block 108 (e.g., to one or more DC/DC converters), the voltage controller measures the voltage at the load, again according to the cyclic measurement pattern (e.g., at the start of the next measurement cycle), in block 110. The voltage controller then determines, in block 112, if the system has returned to steady-state operation. In some embodiments this determination may be based on the rate of voltage change, on the value of the measured voltage, or both. For example, in some embodiments the system may be considered to be back in steady-state operation if the rate of change of voltage (based on the measurement from block 110) is below the voltage-change threshold. In other embodiments, the system may be considered to be back in steady-state operation if the voltage measured at block 110 is near, above, or below a certain voltage value (e.g., a value that is near the midpoint of the processors safe voltage range).

If the voltage controller determines that the system has not returned to steady-state operation, the voltage controller continues to control the voltage according to the oversampling cyclic control pattern in block 108. However, if the voltage controller determines that the system has returned to steady-state operation, the voltage controller returns to controlling the voltage according to the steady-state cyclic control pattern in block 106. The voltage controller would then measure the voltage at the beginning of the next measurement cycle in block 102.

Figure 2A:
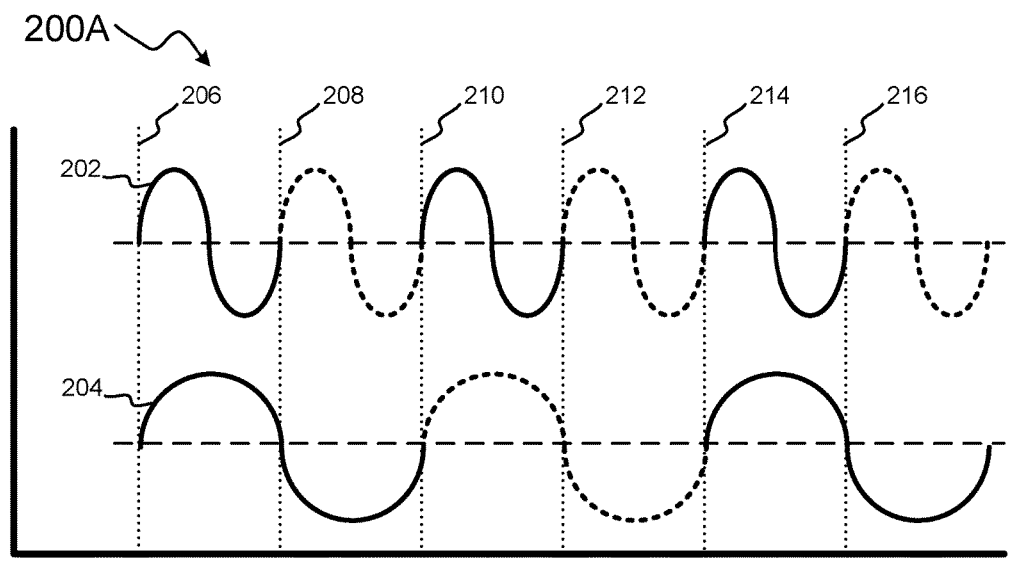
FIG. 2A illustrates an example graphical representation of multiple cyclic PWM patterns, expressed as sinusoidal waves, in accordance with embodiments.
Figure 2B:
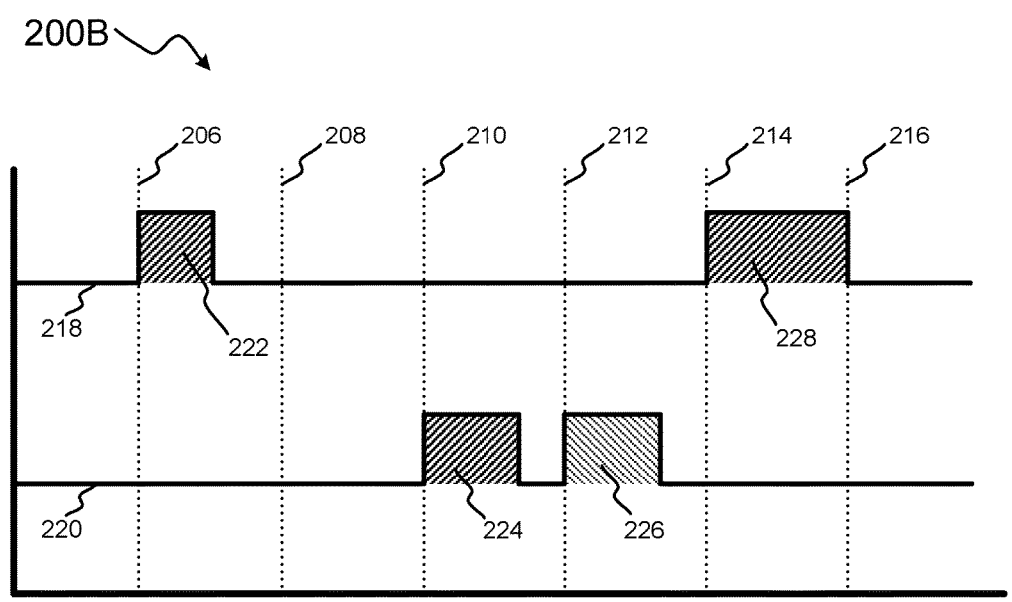
FIG. 2B illustrates an example graphical representation of multiple converters being controlled by multiple cyclic PWM patterns, in accordance with embodiments.

FIGS. 2A and 2B illustrate two example graphical representations of a process similar to method 100 with respect to the passage of time. Graph 200A, for example, illustrates three sinusoidal patterns that represent two example cyclic PWM patterns or cyclic measurement patterns. Pattern 202, for example, represents an oversampling cyclic PWM pattern (or, in the terms of FIG. 1, an "oversampling cyclic control pattern") and/or a cyclic measurement pattern. The cycles of pattern 202 have been illustrated herein as alternating between a solid line and a dotted line, to ease in understanding. Thus, the first, third, and fifth cycles of pattern 202 are represented by solid lines, and the second, fourth, and sixth cycles of pattern 202 are represented by dotted lines.

Pattern 204, on the other hand, represents a steady-state cyclic PWM pattern (or, in the terms of FIG. 1, a "steady-state cyclic control pattern"). Like pattern 202, the cycles of pattern 204 have been illustrated herein as alternating between a solid line and a dotted line. The sinusoidal nature of these patterns does not necessarily represent any property of the associated PWM patterns or the electricity delivered according to those patterns.

The horizontal axis of graph 200A represents the passage of time, wherein time proceeds from the left side of the graph to the right side of the graph. Indicator lines 206-216 represent points in time that coincide with the ending and beginning of the cycles of the oversampling cyclic PWM pattern (referred to with respect to FIGS. 2A and 2B as "the oversampling pattern") associated with pattern 202. Indicator lines 206-208 may, for this reason, also be referred to herein as times 206-216. Thus, the first cycle of the oversampling pattern begins at time 206 and ends at time 208. The second cycle of the oversampling pattern begins at time 208 and ends at 210, and so on. Thus, when controlling voltage according to the oversampling pattern, the voltage controller could issue control commands at any of times 206-216. Similarly, because, in this example, the cyclic measurement pattern is also represented by pattern 202, a voltage controller could also measure the voltage of the system at any of times 206-216.

Pattern 204 represents the steady-state cyclic PWM pattern (referred to with respect to FIGS. 2A and 2B as the steady-state pattern). As disclosed by FIG. 2A, the period of the steady-state pattern is twice as long as the period of the oversampling pattern. For example, both the oversampling pattern and the steady-state pattern begin at time 206. However, whereas the first cycle of the oversampling pattern completes at time 208, the first cycle of the steady-state pattern is only halfway done at time 208, and completes at 210. Thus, in this embodiment, the frequency of the oversampling pattern is twice that of the steady-state pattern (i.e., the period of the oversampling pattern is half that of the steady-state pattern). Thus, when controlling voltage according to the steady-state pattern, the voltage controller could issue control commands at any of times 206, 210, and 214, but not, in this example, at either of times 208 or 212. Note, however, that in other embodiments, the ratio of oversampling control frequency and the steady-state control frequency may be different than 2:1. Indeed, it may be beneficial to operate an oversampling control frequency that is as high as system constraints allow. In these embodiments, the ratio of the oversampling control frequency to the steady-state control frequency may be very large (e.g., 20:1). In some such embodiments, the oversampling control frequency may be set by a required control-loop bandwidth. The control-loop bandwidth is an ability to respond to a change of a given rate. For example, if certain rates of change of voltage are expected, or if rates of change of voltage greater that a particular magnitude would be likely to result in unacceptable damage to or failure of a load device, it may be beneficial to ensure that the system is capable of reacting fast enough to respond to voltage changes of those rates. This ability may be referred to as the control-loop bandwidth. The control-loop bandwidth increases as the measurement and control frequencies increase. Thus, in some embodiments the ratio of the oversampling control frequency and the steady-state frequency may be dependent on the required control-loop bandwidth.

Graph 200B in FIG. 2B illustrates the timeline of graph 200A as applied to two converters (i.e., as applied to the two converters by the pulse commands from a voltage controller) in a two-converter system. Indicator line 218 represents the current delivered by the first converter, and indicator line 220 represents the current delivered by the second converter. For example, where indicator line 218 is low (e.g., as displayed immediately before time 206), the first converter is not pulsing current. However, where indicator line 218 is high (e.g., as displayed immediately after time 206), the first converter is pulsing.

In FIG. 2B, the first and second converters are shown out of phase, and a controller following pattern 204 would alternate providing commands to the first converter and the second converter in alternating cycles. For example, a voltage controller operating according to the steady-state pattern may normally issue a command to the first converter at times 206 and 214 (i.e., the starts of the first and third steady-state cycles) and normally issue a command to the second converter at time 210 (i.e., the start of the second steady-state cycle). In some embodiments, therefore, the steady-state cycles may be expressed as twice as long, from the perspective of each converter, as the cycles of the steady-state pattern 204. For example, one cycle of the steady-state pattern may elapse between time 206 and time 214 from the perspective of the first converter. For this reason, the duty cycles of the first and second converter may be calculated not with respect to the period of the cycles of pattern 204 (e.g., the length of time between time 206 and time 210), but rather with respect to twice the period of the cycles of pattern 204 (e.g., the length of time between time 206 and time 214). Note that this concept may also be extended to embodiments with more than two converters. For example, in an embodiment with 10 direct-current converters, the steady state cycle could be expressed as ten times as long, from the perspective of each converter, as the cycles of the steady-state pattern 204.

For example, a voltage controller may take a first measurement at time 206. The voltage may be within an acceptable range, and thus the voltage controller may command the first converter to provide power at a 12.5% duty cycle (i.e., for the first 12.5% of the elapsed time of the PWM cycle from the perspective of the first converter). This 12.5%% duty cycle is represented by pulse 222, and spans 12.5% of the time between times 206 and 214. This may occur in practice by the voltage controller making a voltage-control decision at time 206. That voltage-control decision may include deciding to what state to set the first converter (e.g., pulsing or not pulsing). If the decision includes deciding to set the first converter to pulse, the decision may also include for how long to set the first converter to pulse (i.e., for what duty cycle). In this case, the voltage controller decides to set the first converter to pulse for a 12.5% duty cycle, and issues a command to the first converter to pulse at 206. Then, halfway between times 206 and 208 (i.e., 12.5% of the time between times 206 and 214), the voltage controller may issue a command to the first converter to stop pulsing.

Continuing the previous example, the voltage controller may take a second voltage measurement at time 208 according to oversampling cyclic PWM pattern 202 (i.e., the voltage controller may measure the voltage again at the start of the second cycle of pattern 202). If the voltage controller identifies a slight decrease in voltage, but determines that the change in voltage is below a voltage-change threshold, the voltage controller may determine to respond to the change by controlling the voltage at the beginning of the next cycle in the steady-state pattern, which occurs at time 210. This may, therefore, involve waiting until time 210 to command the second converter to pulse for slightly longer (e.g., a duty cycle of 16%, representing a pulse for the first 16% of the PWM cycle from the perspective of the second converter) according to the steady-state pattern. This decision would be in lieu of issuing a second command to the first converter to pulse again at time 208 (which would involve controlling the voltage according to the oversampling pattern).

At time 210 the voltage controller again measures the voltage of the system, and determines to send a command to the second converter to pulse for a 16% duty cycle, as planned. This 16% duty cycle is represented by pulse 224. In some embodiments, the determination to send a command to pulse for 16% (as opposed to, for example, 18%) may be based entirely on the measurement collected at time 210. However, in other embodiments a voltage controller may incorporate other recent voltage measurements as well, in order to identify a pattern of recent voltage change on which the determination could be based. For example, a voltage controller may incorporate the measurements from time 210 and 208.

At time 212 the voltage controller once again measures the voltage and identifies a voltage decrease of a magnitude (i.e., the absolute value of the change) that is above the voltage-change threshold. Thus, the voltage controller responds according to the oversampling pattern and issues a command to the second converter to pulse again, starting at time 212 (i.e., rather than responding according to the steady state pattern, which would require waiting until time 214, at which point the voltage controller could issue a command to the first converter). This second pulse by the second converter is represented by pulse 226. This ability to react quickly to a significant transient may, in this example, prevent the voltage of the system from dropping to below the operating range of the load device in the system.

At time 214, the voltage controller again measures the voltage of the system and determines that the system has not yet returned to steady state. For that reason, the voltage controller issues a command to the first converter to pulse for a 25% duty cycle. This 25% duty cycle is represented by pulse 228. Further, the voltage controller may determine to continue to control according to the oversampling pattern (even though, in this example, both the oversampling and steady-state patterns begin a control cycle at 214, so a command could have been issued regardless of the pattern followed). At time 216, the voltage controller again measures the system voltage, and determines that the system has returned to steady-state patterns. For this reason, the voltage controller determines to once more control the system voltage according to the steady-state pattern. Further, the voltage controller confirms the decision made at time 214 to pulse the first converter for a 25% duty cycle, and issues a command at time 216 to the first converter, commanding the converter to stop pulsing.

The voltage control described by the embodiments thus far involves a single voltage controller maintaining a cyclic measurement pattern and multiple cyclic PWM patterns simultaneously. However, in some embodiments multiple voltage controllers may be utilized. One voltage controller, for example, may measure and issue commands according to a steady-state cyclic pattern. This controller may be referred to as a steady-state controller. A second voltage controller, in this example, may measure and issue commands according to an oversampling cyclic pattern. This controller may be referred to as an oversampling controller.

Figure 3:
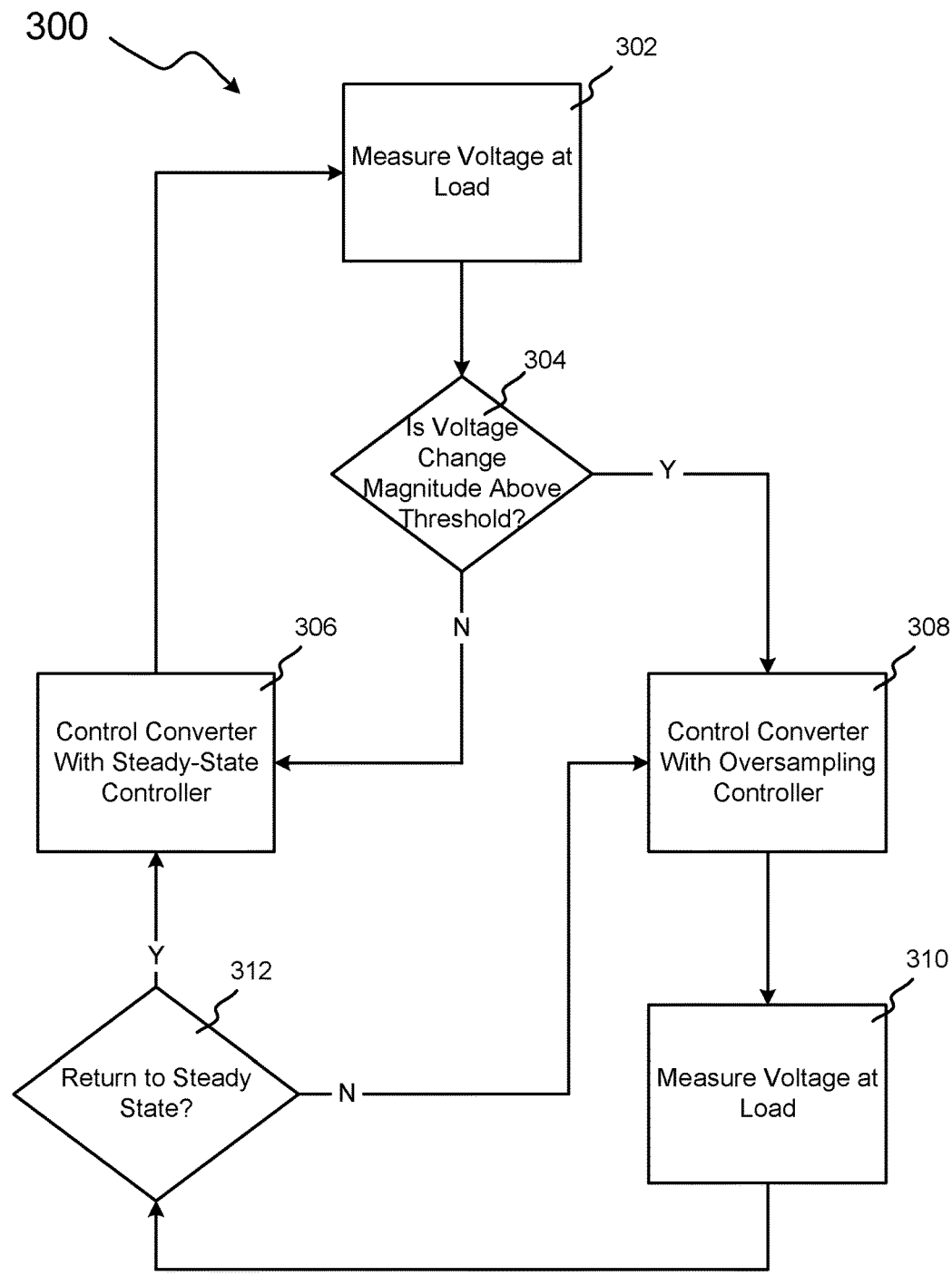
FIG. 3 illustrates a flowchart of an example method of controlling the voltage of a system using two voltage controllers that operate at different cyclic PWM patterns, in accordance with embodiments.

FIG. 3 illustrates a flowchart of an example method 300 of controlling the voltage of a system using two voltage controllers that operate (e.g., measure voltage and issue control commands) at different cyclic PWM patterns. These controllers may be referred to as an "oversampling controller" and a "steady-state controller." The system may be configured such that the steady-state controller controls the voltage during steady-state operations, but the oversampling controller controls the voltage during high-transient events. The period of the PWM cycle of the oversampling controller may be significantly shorter than the period of the PWM cycle of the steady-state controller, and thus the oversampling controller may measure voltage more often, and may be able to issue commands to the converter (or converters) of the system more frequently.

The voltage of the system is measured by both controllers at block 302. At block 304, it is determined whether the absolute value of the voltage change, based on the measurement at block 302, is above a voltage-change threshold. In some embodiments, both controllers may perform block 304, for the purposes of visibility. This may be beneficial, for example, in embodiments in which the two controllers communicate to determine which controller will issue pulse commands to a converter. In other embodiments, only the oversampling controller may perform block 304. This may be beneficial, for example, in embodiments in which the steady-state controller may be unaware of the oversampling controller (and the oversampling controller may be unaware of the steady-state controller), but in which the oversampling controller's commands may override the commands of the steady-state controller.

If it is determined, in block 304, that there is no voltage change above a voltage-change threshold, the converter (or converters) of the system are controlled by the steady-state controller in block 306. In some embodiments, as discussed, this may involve the two controllers communicating based on the determination at block 304, and determining that the steady-state controller would issue commands to the converters, and the oversampling controller would remain inactive. In other embodiments, also as discussed, this may involve each controller responding to the change in voltage as if the other controller does not exist. In this embodiment, the oversampling controller may be configured to only issue commands when a voltage change above a voltage-change threshold occurs. Further, in this embodiment, the oversampling controller may be configured to override the steady-state controller when the steady-state controller does issue a command. Once the steady-state controller controls the converter(s) of the system in block 306, the controllers again measure the voltage in block 302.

However, if it is determined, in block 304, that there is a voltage change above a voltage-change threshold, the converter (or converters) of the system are controlled by the oversampling controller. In some embodiments this may occur with a method similar to one of those already discussed (e.g., the two controllers may communicate and the steady-state controller may remain inactive, or the oversampling controller may override the steady-state controller). The voltage at the load is then measured again at block 310, by at least the oversampling controller, and potentially also the steady-state controller. Whether the steady-state controller measures at 310 may depend, for example, on whether the steady-state controller is beginning a PWM cycle at the time.

Based on the measurement from block 310, it is determined in block 312 whether the system has returned to steady-state operation. This determination may be made in a similar fashion as the determination of block 112 in FIG. 1. If it is determined that the system has not returned to steady-state operation, the oversampling controller continues to control the converter(s) of the system in block 308. However, if it is determined that the system has returned to steady-state operations, the steady-state controller controls the converter(s) of the system in block 306. In some embodiments, the determination of which controller will control the converter(s) based on the decision in block 312 may involve the oversampling controller returning to a state of inactivity. In other embodiments the determination may involve the two controllers communicating with each other, and deciding that the steady-state controller will act, and the oversampling controller will not.

Figure 4A:
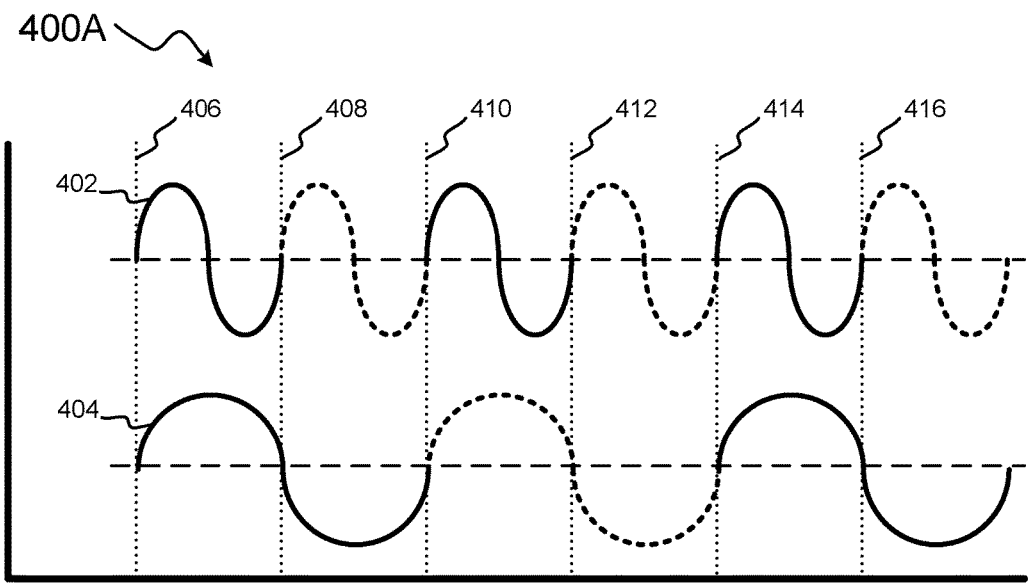
FIG. 4A illustrates an example graphical representation of multiple voltage controllers with different cyclic PWM patterns, expressed as sinusoidal waves, in accordance with embodiments.
Figure 4B:
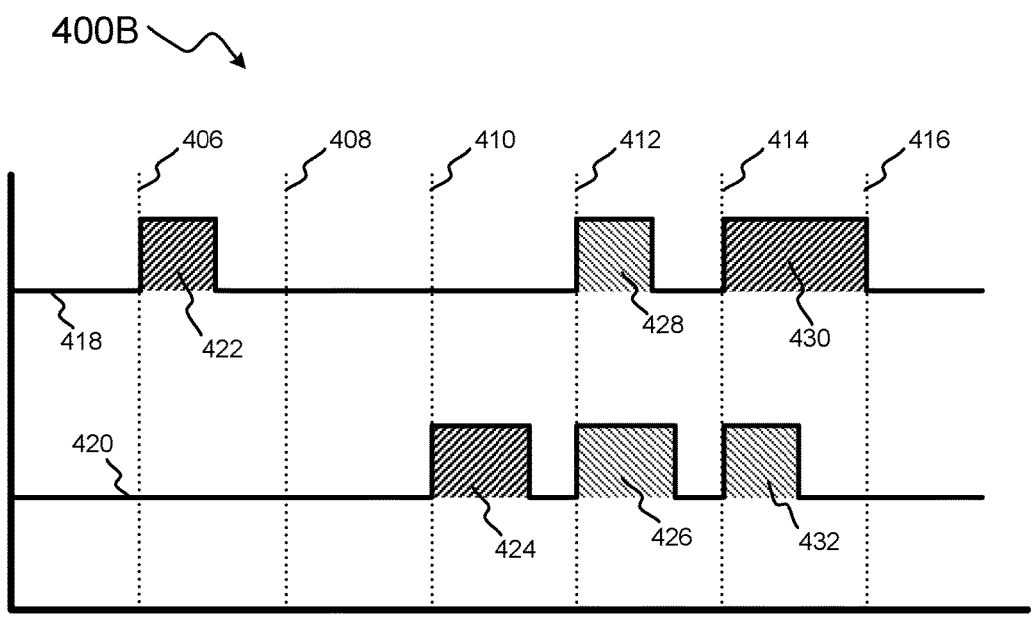
FIG. 4B illustrates an example graphical representation of multiple converters being controlled by multiple voltage controllers, in accordance with embodiments.

FIGS. 4A and 4B illustrate two example graphical representations of a process similar to method 300 with respect to the passage of time. In graph 400A, curve 402 represents the cyclic PWM pattern of the oversampling controller. The cycles of pattern 402 have been illustrated herein as alternating between a solid line and a dotted line, to ease in understanding. Thus, the first, third, and fifth cycles of pattern 402 are represented by solid lines, and the second, fourth, and sixth cycles of pattern 402 are represented by dotted lines. Curve 404, on the other hand, represents the cyclic PWM pattern of the steady-state controller. Like pattern 402, the cycles of pattern 404 have been illustrated herein as alternating between a solid line and a dotted line. In both graph 400A and 400B, the horizontal axis represents the passage of time. Thus, times 406-416 represent the times at which an oversampling controller may measure voltage of the system and issue voltage-control commands (e.g., commands to pulse power). However, only times 406, 410, and 414 represent the times at which a steady-state controller may issue voltage-control commands.

In graph 400B, pattern 418 represents the timeline of graph 400A as applied to two converters in a two-converter system. Indicator line 418 represents the current delivered by the first converter, and indicator line 420 represents the current delivered by the second converter. Similar to discussed in FIG. 2B, where indicator line 418 is low (e.g., as displayed immediately before time 406), the first converter is not pulsing current. However, where indicator line 418 is high (e.g., as displayed immediately after time 406), the first converter is pulsing.

Also similar as discussed in FIG. 2B, the first and second converters in FIG. 4B are shown out of phase, and a controller following pattern 404 may alternate providing commands to the first converter and the second converter in alternating cycles. For example, a voltage controller operating according to the steady-state pattern may normally issue a command to the first converter at times 406 and 414 (i.e., the starts of the first and third steady-state cycles) and normally issue a command to the second converter at time 410 (i.e., the start of the second steady-state cycle). In some embodiments, therefore, the steady-state cycles, from the perspective of each converter, may be expressed as twice as long as the cycles of the steady-state pattern 404. For example, one cycle of the steady-state pattern may elapse between time 406 and time 414 from the perspective of the first converter. For this reason, the duty cycles of the first and second converter may be calculated not with respect to the period of the cycles of pattern 404 (e.g., the length of time between time 406 and time 410), but rather with respect to twice the period of the cycles of pattern 404 (e.g., the length of time between time 406 and time 414).

In graph 400B, the events occurring at times 406, 408, and 410 may be similar to those of times 206, 208, and 210 of FIG. 2. In other words, the controllers may determine at times 406, 408, and 410 that a voltage change is not above a voltage-change threshold, and may issue commands causing pulses 422 and 424 as a result. Further, at time 412, a voltage decrease that is above a voltage-change threshold may be detected, and the oversampling controller issues a command to the second converter to pulse for an additional 16% of the duty cycle, illustrated by pulse 426. This would increase the total duty cycle, as measured since time 410, for the second converter to 32%. The oversampling controller may also issue a command at time 412 to the first converter to pulse for an additional 12.5% of the duty cycle, illustrated by pulse 428. This would increase the total duty cycle, as measured since time 406, for the first converter to 25%. Pulse 428, however, occurs during a time at which the steady-state controller would not normally issue a command to the first converter to begin pulsing, because it is between times 410 and 416, which mark the boundaries of the second cycle of pattern 404. Thus, while the steady-state controller may issue a command to the first converter to stop pulsing between times 410 and 414 (e.g., when the first converter was commanded to pulse for at least a 50% duty cycle at 406), the steady-state controller would typically only issue commands to start pulsing to the second converter between times 410 and 414.

However, by issuing a pulse command at time 412, the oversampling controller would effectively be overriding the steady-state controller's pattern of alternating between the first and second converters. This also reflects an ability of the oversampling controller to activate both converters at the same time. This may be beneficial to increase the effect of the voltage control at mitigating a large voltage decrease. Because the load device is receiving twice as much electricity, the perceived voltage may be greater, which may expedite the return to steady-state operations.

The oversampling controller may measure the power at 414, and determine that the voltage decrease has not improved, but, rather, has worsened. In order to avoid a potentially dangerous under-voltage situation, the oversampling controller may issue a command to both the first and second converters to pulse again These pulses are represented by pulses 430 and 432. The oversampling controller may have decided, at time 414, to pulse the second converter for an additional 12.5% of the duty cycle. This would bring the total duty cycle of the second converter, as measured from time 410, to 44.5%. As such, the oversampling controller may issue a command to the second converter to stop pulsing halfway between times 414 and 416.

Further, the oversampling controller may have decided, at time 414, to maintain pulse 430 past time 416 (e.g., over a 25% duty cycle, as measured from time 414). However, upon measuring the voltage at 416, the oversampling voltage controller may determine that the system is back in steady-state operations (or even that an over-voltage situation is occurring). For this reason, the oversampling controller issues a shut-off command to converter 1 at time 416. At this point, the system may return to control by the steady-state controller.

As illustrated here, the method of activating all converters to respond to a voltage change is only presented with respect to a system with multiple discrete voltage controllers. However, it is consistent with the embodiments of this disclosure that such a method could be performed in the same way utilizing a single voltage controller, as disclosed by FIG. 1, for example. Further, the method of activating all converters is presented as only performed by an oversampling controller. However, it is also consistent with the embodiments of this disclosure that such a method could be performed by a steady state controller (e.g., such as the steady-state controller operating according to pattern 404).

In some embodiments, it may be beneficial to consider whether the methods discussed herein may be used to avoid short intervals in which a converter quickly switches off and back on again. This may avoid inefficiencies due to voltage ramp times associated with a converter activating and deactivating. Further, some converters may be incapable of switching on or off instantly, and thus ramp times may exist between a controller transitioning from 0% power to 100% power. If these ramp times are not accurately accounted for in calculations of the average voltage over time, the calculated average voltage may differ than the actual average voltage. This may be exacerbated when switching a converter off and back on again (or an and back off again) in quick succession, as the ramp times may make up a proportionately larger portion of the total on or off time (e.g., the converter may be ramping up and down for a significant amount of time that the controller is expected to be on).

For example, in graph 400B, the oversampling controller may recognize, when issuing a command for the first converter to perform pulse 428, that the first converter will likely be required to pulse again at time 414. Thus, it is foreseeable at time 412 that the first converter would be deactivating at the end of pulse 428 and reactivating again shortly thereafter at the beginning of pulse 430. In such an instance, it may be beneficial to simply extend pulse 428 to time 414, which would avoid any switching losses.

Figure 5:
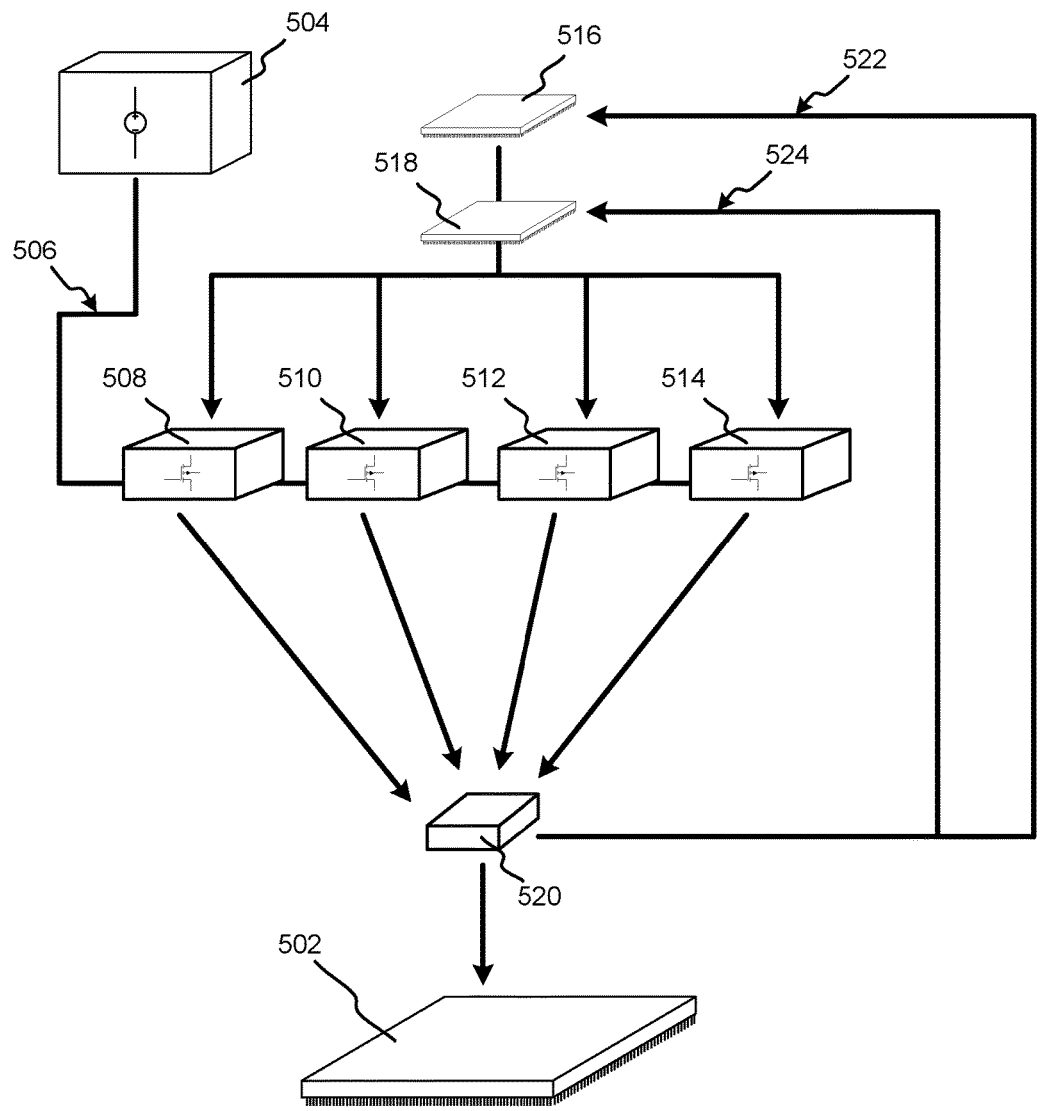
FIG. 5 illustrates a structure diagram of a system in which one or more power controllers may control the voltage at a load device, in accordance with embodiments.

FIG. 5 illustrates a structure diagram of a system in which one or more power controllers may control the voltage at a load device. In FIG. 5, device 502 is powered by power source 504. Device 502 may be any electronic device. In some embodiments device 502 may be a sensitive electronic device, such as a computer processor or ASIC. Power source 504 provides power through line 506 (which may be a wire that is, for example, embedded in a circuit board) to converters 508-514. Converters 508-514 may be DC/DC MOSFET-based converters, and may operate out of phase with each other. In other words, converters 508-514 may be configured such that, during normal (e.g., steady-state) operation, a steady-state controller would only issue a command to start pulsing to one converter at any given time. However, it is possible that, during high-transient situations, more than one of converters 508-514 (e.g., converters 510 and 514 or all of converters 508-514) may pulse simultaneously, if commanded by, for example, an oversampling controller.

Converters 508-514 are controlled by at least power controller 516. In some embodiments, the system may also contain a second power controller, power controller 518. Power controller 516 may operate during steady-state operation, whereas power controller 518 may operate during periods of high-transient voltage. Power controller 518 may be configured to override the output of power controller 516 in situations in which a voltage change is greater than a voltage change threshold. For example, in some embodiments power controller 516, which may be a steady-state controller, may make a voltage-control decision at the beginning of each steady-state cycle. Power controller 518, which may be an oversampling controller, however, may make a preliminary decision at each oversampling cycle. This preliminary decision may be whether or not to override the contemporaneous or most-recent decision made by the controller 516. This may be based on whether a voltage change is above a voltage-change threshold. For example, controller 518 may determine to override a voltage-change decision that controller 516 is currently making (e.g., in an instance in which the beginning of the current oversampling cycle occurs at the same time as the beginning of the current steady-state cycle), to override a voltage-change decision that controller 516 already made (e.g., in an instance in which the beginning of the current oversampling cycle occurs after the beginning of the current steady-state cycle), or to defer to the voltage-change decision of controller 516.

If controller 518 decides, in the preliminary decision, to override a voltage-change decision by controller 516, it may then make a voltage-change decision. That voltage change decision may be to switch a converter (or more than one converter) to pulse or to not pulse.

In some embodiments, these two decisions may be compacted into one. For example, controller 518 may decide, at the beginning of each cycle, between three options: to switch a converter (or more than one converter) to the "on" state (i.e., pulsing), to switch a converter (or more than one converter) to the "off" state (i.e., not pulsing), or to defer to the current or most recent voltage-change decision by controller 516. In other embodiments, power controller 516 and 518 may be in communication, and may determine together which of power controllers 516 and 518 should be active at any given time.

In some embodiments, power controller 518 may not be included as a physical component in the system. Rather, the actions of power controller 518 may be performed by an algorithm, or a series of algorithms, as part of power controller 516. In these embodiments, these algorithms or series of algorithms may take the form of a series of logic gates within or connected to controller 516 that determine whether to control power according to a steady-state pattern or an oversampling pattern (e.g., with "controller" 518). For example, controller 516 may contain two decision-algorithms: a steady-state algorithm and an oversampling algorithm. Each algorithm may make a voltage-control decision at the beginning of each steady-state cycle, and the oversampling algorithm may also make a voltage-control decision at the beginning of each oversampling cycle.

For example, a decision by controller 516 may be modeled by a steady-state algorithm with one output variable ("high" or "low") that inputs into an AND gate and an oversampling algorithm with two output variable (both either "high" or "low"). The first oversampling output may input into the AND gate along with the output of the steady-state algorithm. The second oversampling output may input into an OR gate along with the output of the AND gate. The output of the OR gate may command a converter to pulse when it outputs "high" (i.e., when either input to the OR gate is "high").

The steady-state algorithm may output "high" (e.g., 1) when it decides to set a converter (or multiple converters) to an "on" state and output "low" (e.g., 0) when it decides to set a converter to an "off" state. The oversampling algorithm may output "high" on the second oversampling output when it decides to set the converter to an "on" state, which may include overriding a decision by the steady-state algorithm to set the converter to the "off" state or "agreeing" with a decision by the steady-state algorithm to set the converter to the "on" state. The oversampling algorithm may output "low" on the second oversampling output when it either decides to defer to the decision of the steady-state algorithm, or to set the converter to the "off" state (which, again, may include overriding a decision of the steady-state algorithm to set the converter to the "on" state, or "agreeing" with a decision of the steady-state algorithm to set the converter to the "off" state). The oversampling algorithm may output "high" on the first oversampling output when it decides to defer to the decision of the oversampling controller. The oversampling algorithm may output "low" on the first oversampling output when it decides to set the converter to the "off" state (which, again, may include overriding a decision of the steady-state algorithm to set the converter to the "on" state, or "agreeing" with a decision of the steady-state algorithm to set the converter to the "off" state).

In embodiments in which controllers 516 and 518 are both physical controllers, controller 518 may override or defer to the decision of controller 516 with a more direct circuit that either interrupts or does not interrupt the output of controller 516. However, in some embodiments, the outputs of controllers 516 and 518 may be input into a logic-gate system similar to the logic-gate system discussed above.

Converters 508-514 (specifically, the converter that is being commanded by one of power controllers 516 and 518 to pulse power) send power to processor 502 by pulsing during their respective PWM cycle. The power may first be routed through at least one component in order to smooth out the power delivered. For example, in some embodiments converters 508-514 may send power to processor 502 through an inductor and capacitor.

Power may be sent to the processor through voltage measurement system 520. Voltage measurement system 520 may measure the voltage of the power being delivered to the device 502. Voltage measurement system 520 may be a discrete measurement unit that is not physically incorporated into 516 or 518, or may be physically incorporated into one or both of 516 and 518. In other embodiments, voltage measurement system may be software component (e.g., an algorithm) that is part of a hardware component (e.g., one or both of power controllers 516 and 518. In some embodiments voltage measurement system may actually represent multiple voltage measurement systems. For example, in some embodiments there may be at least one voltage management system for every power controller present in the system.

Voltage measurement system 520 may deliver voltage measurements to power controllers 516 and 518 through data lines 522 and 524 respectively. In some embodiments, power management system 520 may provide measurements through data line 522 may at the beginning of each PWM cycle observed by power controller 516, whereas in other embodiments voltage measurement system 520 may provide measurements through data line 522 at the same cyclic PWM pattern according to which power controller 518 operates. Power controllers 516-518 may then base voltage-control decisions on the voltage measurements delivered by voltage measurement system 520. In embodiments in which power controller 518 is not present, data line 524 may also be omitted.

In some embodiments of the present disclosure, more than two voltage controllers (or one voltage controller capable of operating according to more than two cyclic control patterns) may be desired. This may be beneficial, for example, in adding more granularity to the ability to control or select the cycle length of cyclic PWM patterns. Thus, in some embodiments either of voltage controller 516 or 518 may represent two or more voltage controllers that observe the same or different cycle lengths of their respective cyclic PWM patterns. For example, in some embodiments five voltage controllers may be present. A first voltage controller may operate (e.g., measure voltage and make voltage-control decisions) at 100 kHz, a second at 200 kHz, a third at 400 kHz, a fourth at 1.2 MHz, and and a fifth at 2.4 MHz. In these embodiment, the first controller may be a steady state controller, and each of the second through the fifth controllers may be oversampling controllers that may override the decisions of the first voltage controller in situations of large changes in voltage. For example, the second voltage controller may override the first voltage controller if it detects a voltage change above a first threshold. However, the third controller may override the first and second controller if it detects a voltage change above a second threshold that is larger than the first threshold, and so on.

Some embodiments of the present disclosure are described with regard to utilizing multiple simultaneous cyclic PWM patterns of varying frequencies in order to attain both converter efficiency and fast response to large changes in voltage. However, in some embodiments of the present disclosure, one or more voltage controller may control voltage by, in addition to or instead of some or all of the discussed methods for using multiple patterns, varying the length of a PWM cycle in response to a voltage change above a voltage-change threshold. This may be beneficial, for example, when it is not feasible or practical to maintain multiple simultaneous cyclic PWM patterns of different lengths. Rather, in some embodiments one cyclic PWM pattern may be utilized with one by one or more controllers, but the PWM period (i.e., the length of each cycle) of that cyclic PWM pattern may be increased or decreased in response to large voltage spikes or drops. This may also be beneficial in embodiments with multiple voltage controllers or one voltage controller operating at multiple frequencies. For example, in a system with two voltage controllers, an oversampling voltage controller may override the decisions of a steady-state voltage controller if it detects a voltage change above a first threshold. However, the oversampling voltage controller may also monitors voltage changes with respect to a second threshold that is larger than the first threshold. If the oversampling voltage controller identifies a voltage change above this second threshold, it may imply a more dangerous voltage situation, and the oversampling controller may reduce the length of the PWM cycle as a result.

Figure 6:
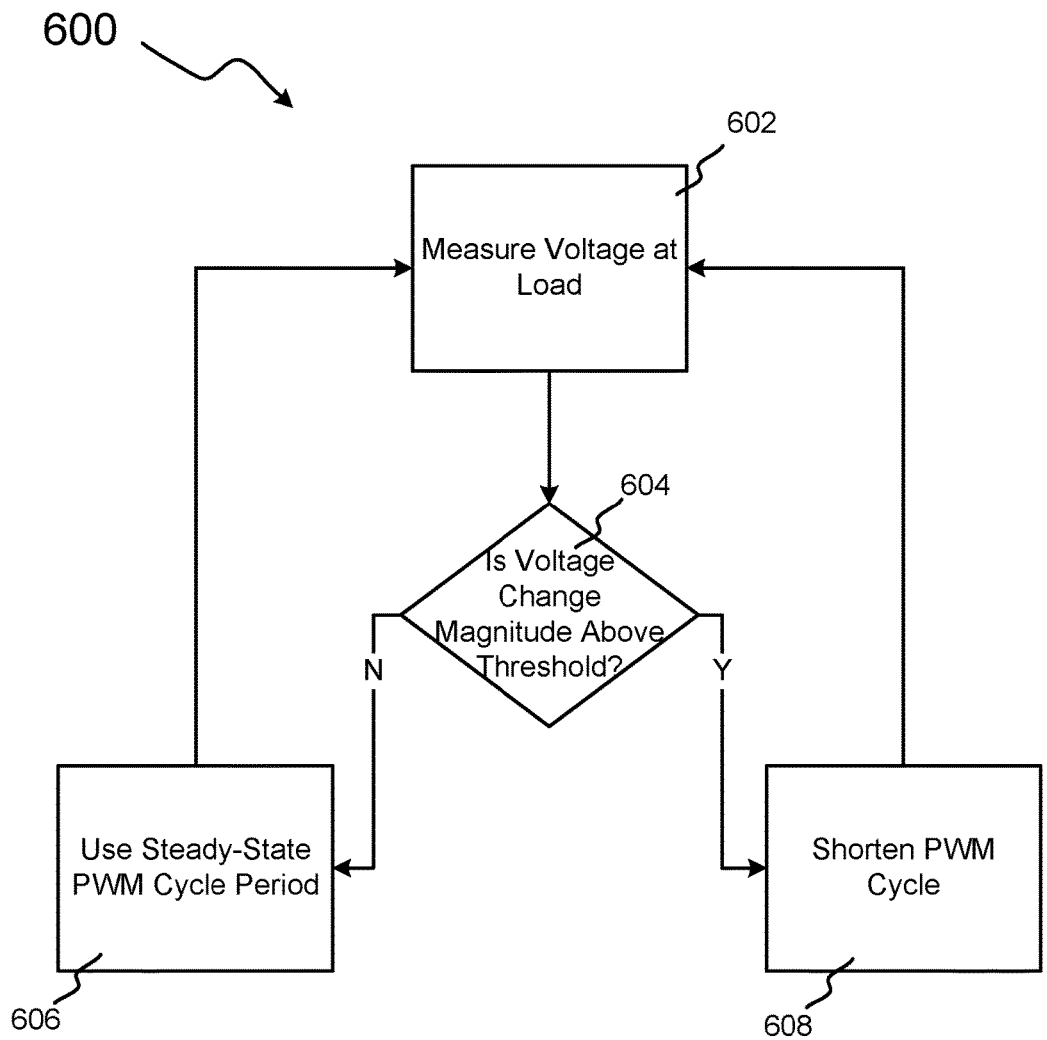
FIG. 6 illustrates a flowchart of an example method of controlling the voltage at a device by varying the length of the PWM cycle, in accordance with embodiments.

FIG. 6 illustrates a flowchart of an example method 600 of controlling the voltage at a device by varying the length of the delivered PWM cycle. In block 602, the voltage at the load device is measured. In some embodiments, this measurement may be performed by an oversampling voltage controller, or a voltage controller that is operating at both an oversampling frequency and a steady-state frequency. In block 604, a voltage controller determines, based on the voltage measurement in block 602, whether there is a voltage change that has a magnitude that is above a voltage change threshold. For example, an oversampling controller may utilize a lower voltage-change threshold to determine whether to override the decisions of a steady-state controller. This oversampling controller may also utilize the voltage-change threshold of block 604. The voltage-voltage change threshold of block 604 may be higher than the lower voltage-change threshold, such that it is only triggered due to voltage changes of particularly high magnitudes.

If there is no voltage change, or a voltage change that is not greater than the voltage-change threshold is identified, the voltage controller uses a steady-state PWM cycle period in block 606 to control the voltage at the processor (e.g., by issuing a pulse command to a converter). The voltage controller then obtains updated voltage measurements in block 602.

If, however, the voltage controller identifies, in block 604, a voltage change over the voltage-change threshold (e.g., the higher voltage-change threshold previously discussed), the voltage controller then shortens, in block 608, the PWM cycle of the cyclic PWM pattern according to which the voltage controller is controlling the converters.

After shortening the PWM cycle in block 608, the voltage controller then obtains updated voltage measurements in block 602.

In some embodiments of method 600, multiple converters may be present at a phase shift that is designed to facilitate delivery of smooth power. In these embodiments, it may be beneficial to maintain the phase shift of the multiple converters when the PWM period is decreased in block 608. In these embodiments, it may be necessary to design the (or one of the) voltage controllers as a high-speed ASIC or custom PWM peripheral in order to provide greater capability for the voltage controller to recalculate phase offsets quickly.

In some embodiments of the present disclosure, a voltage decision or command to set a converter to a particular state (e.g., an "off" state or an "on" state) is disclosed. Those embodiments may include changing the converter from a prior state (e.g., off) to a new state (e.g., on). However, it is also contemplated to be consistent with the embodiments of the present disclosure for a decision or command to "set" a converter to a particular state to include maintaining the converter at that state. For example, a command for a converter to turn "on" may include maintaining the "on" state of the converter if the converter is already in the "on" state when the command is issued. Similarly, a decision for a converter to turn "off" may include maintaining the "off" state of the converter if the converter is already in the "off" state when the decision is made.

Figure 7:
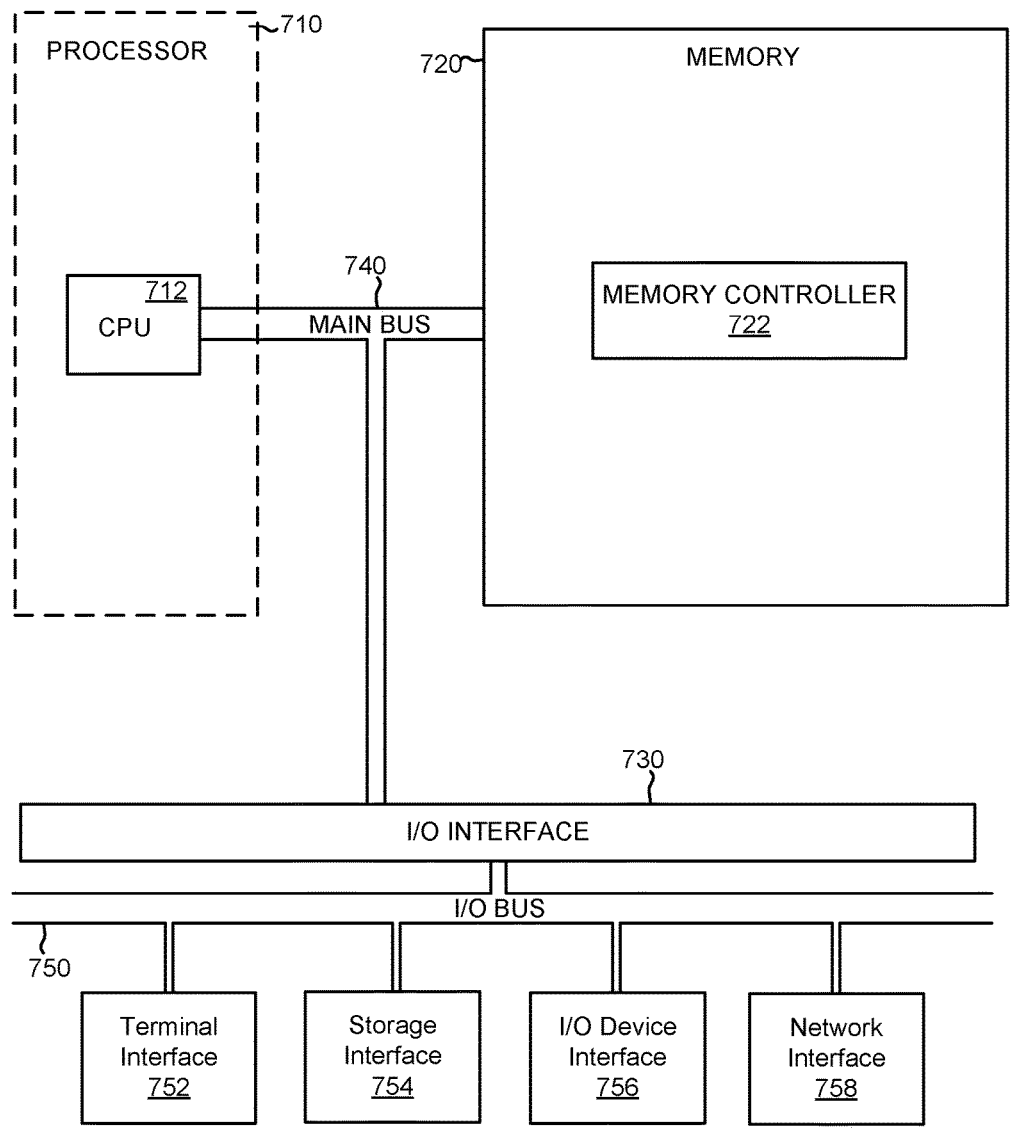
FIG. 7 depicts the representative major components of a computer system that may be used in accordance with embodiments.

FIG. 7 depicts the representative major components of an exemplary Computer System 701 that may be used in accordance with embodiments of the present disclosure. The particular components depicted are presented for the purpose of example only and are not necessarily the only such variations. The Computer System 701 may comprise a Processor 710, Memory 720, an Input/Output Interface (also referred to herein as I/O or I/O Interface) 730, and a Main Bus 740. The Main Bus 740 may provide communication pathways for the other components of the Computer System 701. In some embodiments, the Main Bus 740 may connect to other components such as a specialized digital signal processor (not depicted).

The Processor 710 of the Computer System 701 may be comprised of one or more CPUs 712. The Processor 710 may additionally be comprised of one or more memory buffers or caches (not depicted) that provide temporary storage of instructions and data for the CPU 712. The CPU 712 may perform instructions on input provided from the caches or from the Memory 720 and output the result to caches or the Memory 720. The CPU 712 may be comprised of one or more circuits configured to perform one or methods consistent with embodiments of the present disclosure. In some embodiments, the Computer System 701 may contain multiple Processors 710 typical of a relatively large system. In other embodiments, however, the Computer System 701 may be a single processor with a singular CPU 712.

The Memory 720 of the Computer System 701 may be comprised of a Memory Controller 722 and one or more memory modules for temporarily or permanently storing data (not depicted). In some embodiments, the Memory 720 may comprise a random-access semiconductor memory, storage device, or storage medium (either volatile or non-volatile) for storing data and programs. The Memory Controller 722 may communicate with the Processor 710, facilitating storage and retrieval of information in the memory modules. The Memory Controller 722 may communicate with the I/O Interface 730, facilitating storage and retrieval of input or output in the memory modules. In some embodiments, the memory modules may be dual in-line memory modules.

The I/O Interface 730 may comprise an I/O Bus 750, a Terminal Interface 752, a Storage Interface 754, an I/O Device Interface 756, and a Network Interface 758. The I/O Interface 730 may connect the Main Bus 740 to the I/O Bus 750. The I/O Interface 730 may direct instructions and data from the Processor 710 and Memory 720 to the various interfaces of the I/O Bus 750. The I/O Interface 730 may also direct instructions and data from the various interfaces of the I/O Bus 750 to the Processor 710 and Memory 720. The various interfaces may comprise the Terminal Interface 752, the Storage Interface 754, the I/O Device Interface 756, and the Network Interface 758. In some embodiments, the various interfaces may comprise a subset of the aforementioned interfaces (e.g., an embedded computer system in an industrial application may not include the Terminal Interface 752 and the Storage Interface 754).

Logic modules throughout the Computer System 701—including but not limited to the Memory 720, the Processor 710, and the I/O Interface 730—may communicate failures and changes to one or more components to a hypervisor or operating system (not depicted). The hypervisor or the operating system may allocate the various resources available in the Computer System 701 and track the location of data in Memory 720 and of processes assigned to various CPUs 712. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A power-delivery system comprising:
 a load device;
 a first direct-current converter configured to deliver current to the load device when the first direct-current converter is in an on state;
 a voltage measurement system configured to measure, at a beginning of each PWM cycle in a cyclic PWM pattern, a voltage at the load device; and
 a power controller configured to:
  receive, at the beginning of a first PWM cycle in the cyclic PWM pattern, a first measurement of the voltage;
  detecting, based on the first measurement of the voltage, a first change in the measurement of the voltage that is above a voltage-change threshold;
  shorten, at the beginning of the first PWM cycle and based on the detecting the first change, a PWM period of the cyclic PWM pattern;

receive, at the beginning of a second PWM cycle in the cyclic PWM pattern, as second measurement of the voltage;

detecting, based on the second measurement of the voltage, a second change in the measurement of the voltage that is below a voltage-change threshold; and lengthen, at the beginning of the second PWM cycle and based on the detecting the second change, the PWM period of the cyclic PWM pattern.

2. The power-delivery system of claim 1, wherein the first power controller is an application-specific integrated circuit.

3. The power-delivery system of claim 1, wherein the first power controller is a custom PWM peripheral.

4. The power-delivery system of claim 1, further comprising a second direct-current converter configured to deliver current to the load device when the second direct-current converter is in an on state, wherein the power controller is further configured to maintain the states of the first and second direct-current converters to facilitate delivery of smooth power.

5. The power-delivery system of claim 4, wherein the power controller is further configured to maintain a phase shift of the first and second direct-current converter when the PWM period of the cyclic PWM pattern is shortened.

6. A method of controlling a voltage at a load device, the method comprising:

measuring, at the beginning of a first PWM cycle in a cyclic PWM pattern, a first voltage at the load device;

detecting, based on the first voltage, a first change in the voltage;

determining that the first change in the voltage is below a voltage-change threshold;

maintaining, based on the determining that the first change in voltage is below the voltage-change threshold, a steady-state PWM cycle length of the cyclic PWM pattern;

measuring, at the beginning of a second cycle in the cyclic measurement pattern, a second voltage at to the load device;

detecting, based on the second voltage, a second change in the voltage;

determining that the second change in the voltage is above a voltage-change threshold; and shortening, based on the determining that the second change in voltage is above the voltage-change threshold, the PWM cycle length of the cyclic PWM pattern.

7. The method of claim 6, wherein the PWM cycle length is shortened by an application-specific integrated circuit.

8. The method of claim 6, wherein the PWM cycle length is shortened by a custom PWM peripheral.

9. The method of claim 6, wherein the shortening further comprises recalculating phase offsets of a first direct-current converter and a second direct-current converter.

\* \* \* \* \*